(12) United States Patent
Koike

(10) Patent No.: US 8,134,320 B2
(45) Date of Patent: Mar. 13, 2012

(54) FUEL CELL DRIVE SYSTEM

(75) Inventor: Yuichi Koike, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 529 days.

(21) Appl. No.: 12/374,020

(22) PCT Filed: Aug. 10, 2007

(86) PCT No.: PCT/JP2007/000866
§ 371 (c)(1),
(2), (4) Date: Jan. 15, 2009

(87) PCT Pub. No.: WO2008/018182
PCT Pub. Date: Feb. 14, 2008

(65) Prior Publication Data
US 2009/0267556 A1    Oct. 29, 2009

(30) Foreign Application Priority Data

Aug. 11, 2006 (JP) ................................. 2006-219535

(51) Int. Cl.
*H02P 7/00* (2006.01)
(52) U.S. Cl. ........ 318/432; 318/139; 318/434; 318/440; 180/65.31; 429/43; 429/429; 429/431; 701/22
(58) Field of Classification Search ................... 318/139, 318/432, 434, 440; 701/22; 180/65.31; 429/413, 429/429, 431
See application file for complete search history.

(56) References Cited

U.S. PATENT DOCUMENTS

| | | | |
|---|---|---|---|
| 2001/0053950 A1 | 12/2001 | Hasegawa et al. | |
| 2002/0068203 A1* | 6/2002 | Hiyoshi et al. | 429/19 |
| 2002/0162694 A1* | 11/2002 | Iwasaki | 180/65.3 |
| 2002/0175010 A1* | 11/2002 | Kobayashi et al. | 180/65.3 |
| 2003/0094816 A1* | 5/2003 | Kazama | 290/40 C |
| 2004/0234825 A1* | 11/2004 | Numao et al. | 429/9 |
| 2005/0197751 A1* | 9/2005 | Koike | 701/22 |
| 2006/0093880 A1 | 5/2006 | Igarashi et al. | |
| 2006/0222918 A1* | 10/2006 | Koike | 429/24 |
| 2006/0257698 A1 | 11/2006 | Ishikawa et al. | |
| 2007/0088483 A1* | 4/2007 | Yoshida | 701/69 |
| 2008/0176117 A1* | 7/2008 | Koike | 429/14 |

FOREIGN PATENT DOCUMENTS

| | | |
|---|---|---|
| DE | 10 2005 052 019 A1 | 5/2006 |
| JP | 2005-071797 A | 3/2005 |
| WO | WO 2005/018979 A1 | 3/2005 |
| WO | WO 2006/103504 A1 | 10/2006 |

* cited by examiner

*Primary Examiner* — Walter Benson
*Assistant Examiner* — Kawing Chan
(74) *Attorney, Agent, or Firm* — Foley & Lardner LLP

(57) ABSTRACT

A motor system includes a drive motor configured to generate a drive force using power supplied from a fuel cell; an idle control unit configured to operate the fuel cell intermittently between an idle operation mode and an idle stop mode; a state detection unit configured to detect a state of the fuel cell when the idle stop mode of the fuel cell ends; a recovery time estimation unit configured to estimate a recovery time taken for total voltage of the fuel cell to reach voltage at the idle operation based on the state of the fuel cell detected by the state detection unit; and a control unit configured to perform a correction control for torque of the drive motor based on the recovery time estimated by the recovery time estimation unit.

7 Claims, 10 Drawing Sheets

[Fig. 1]
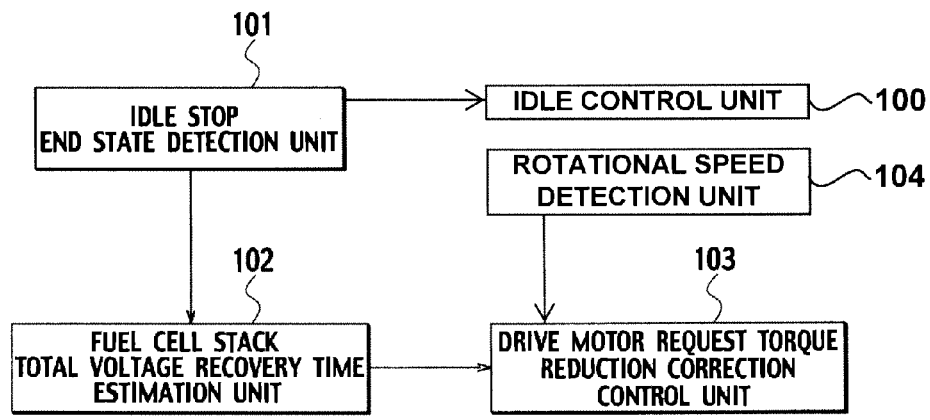
[Fig. 2]
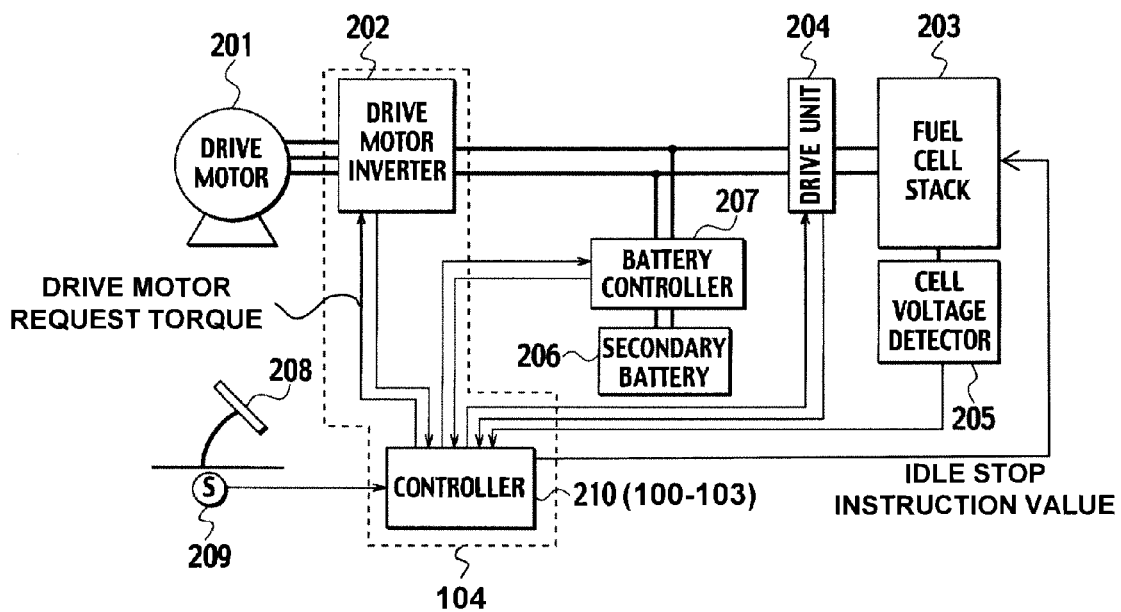

[Fig. 3]
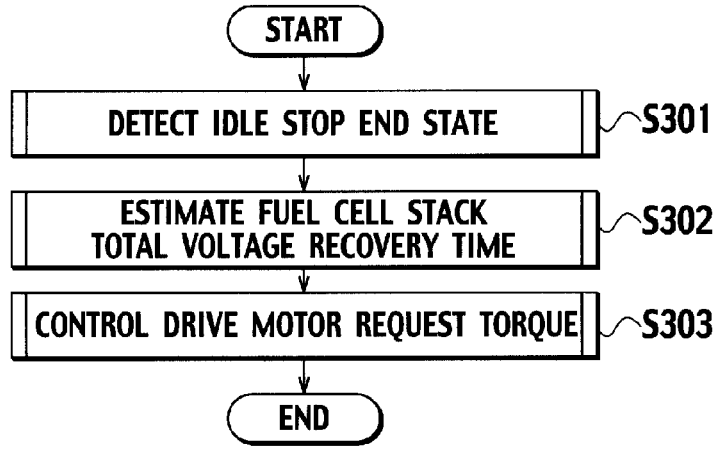
[Fig. 4]
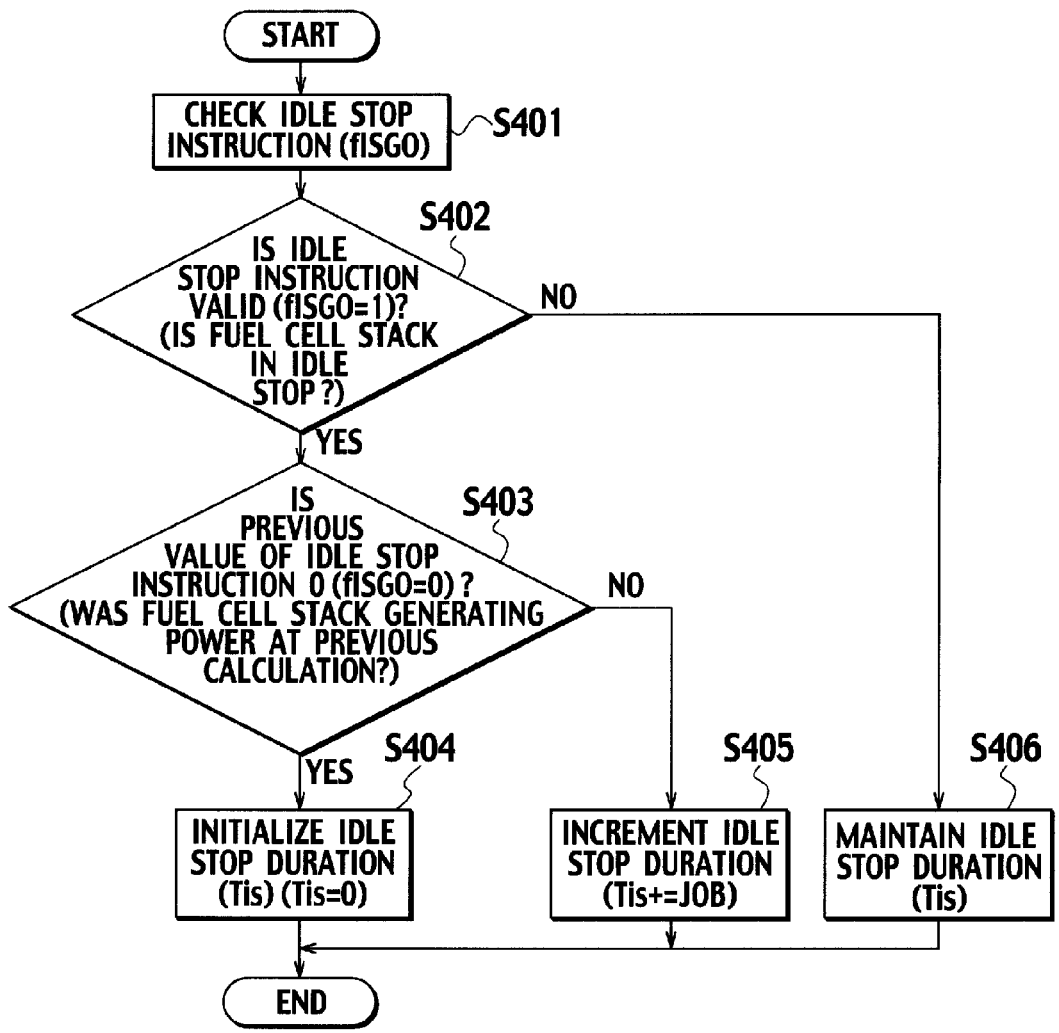

[Fig. 5]
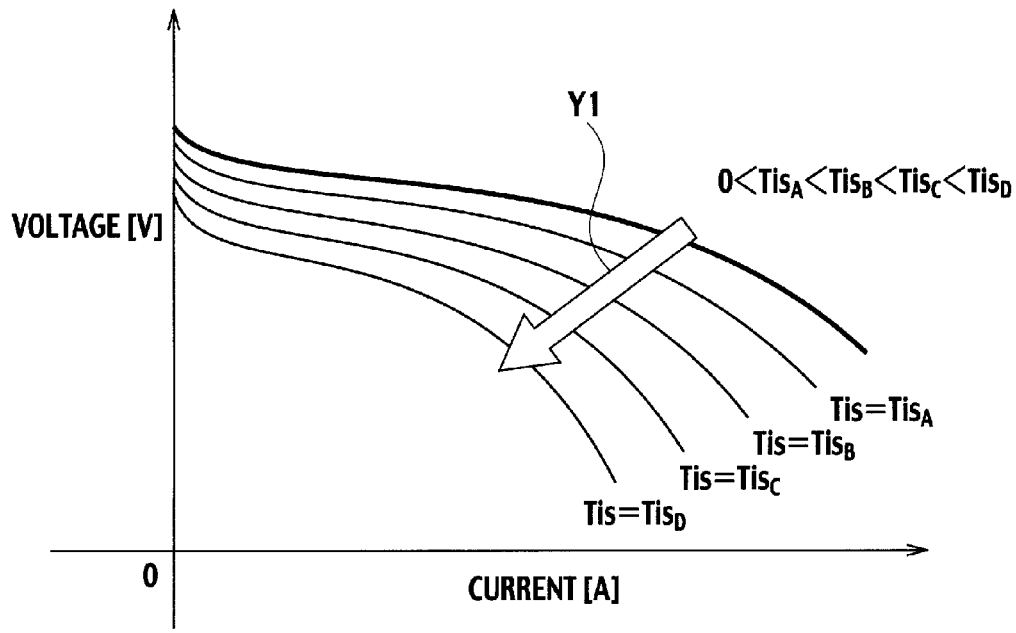
[Fig. 6]
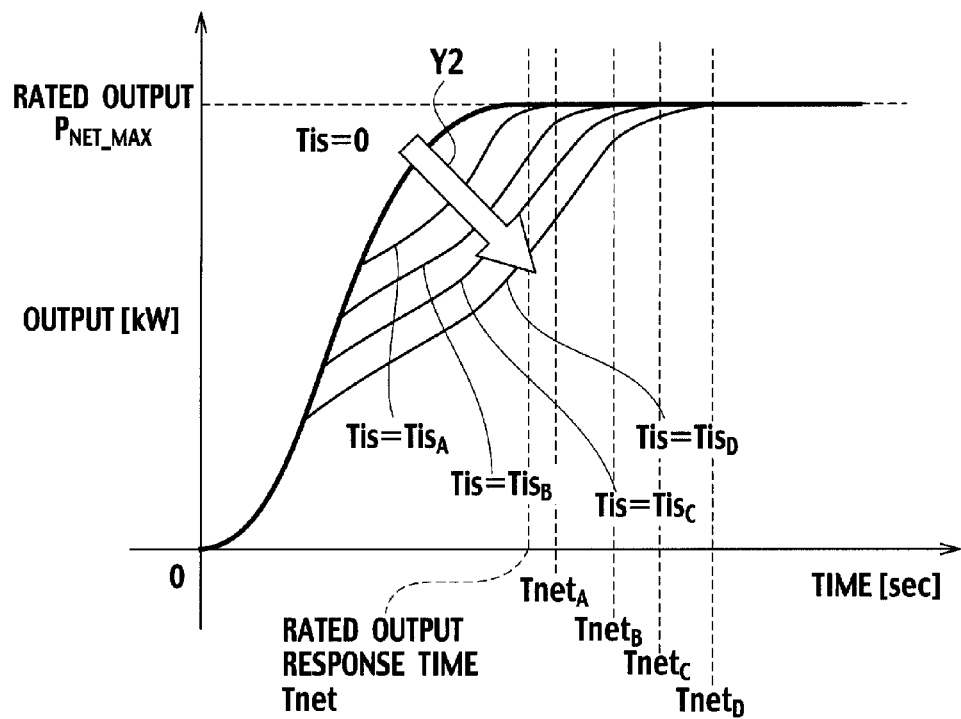

[Fig. 7]
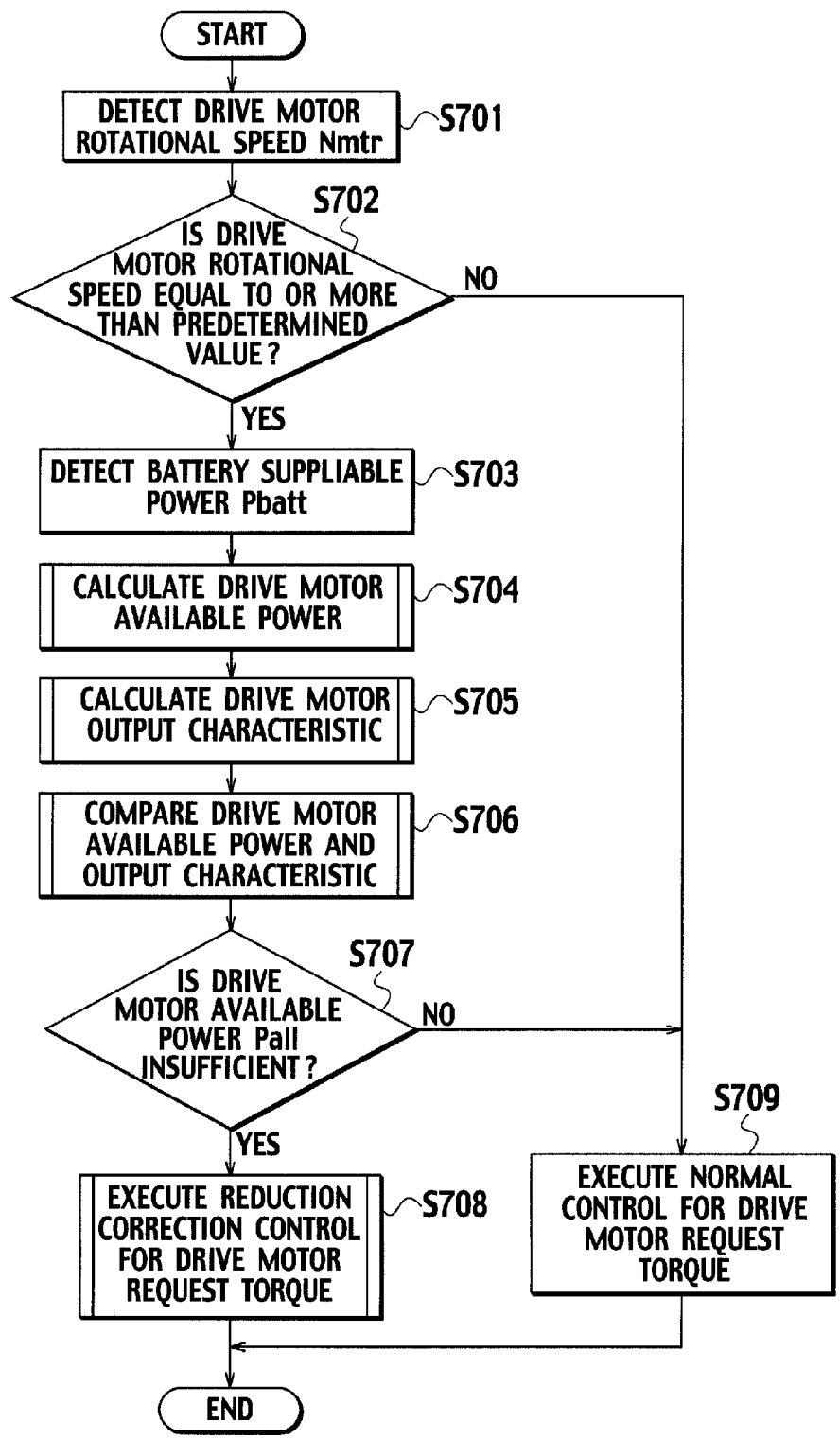

[Fig. 8]
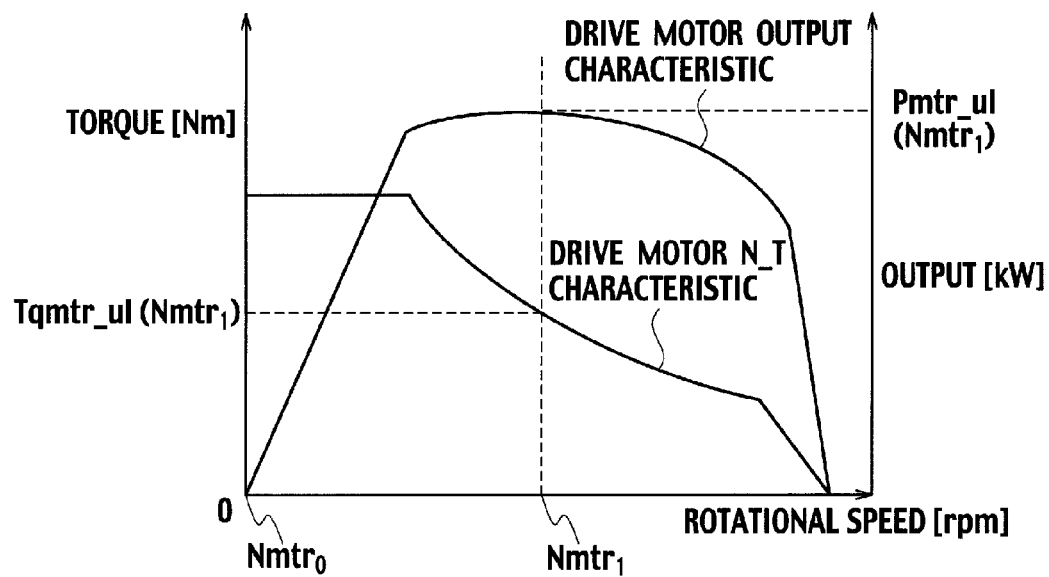
[Fig. 9]
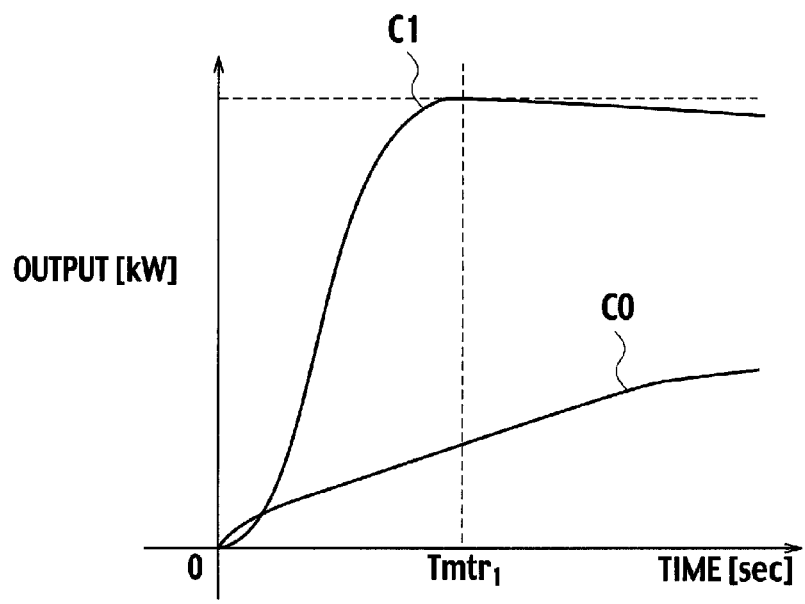

[Fig. 10]
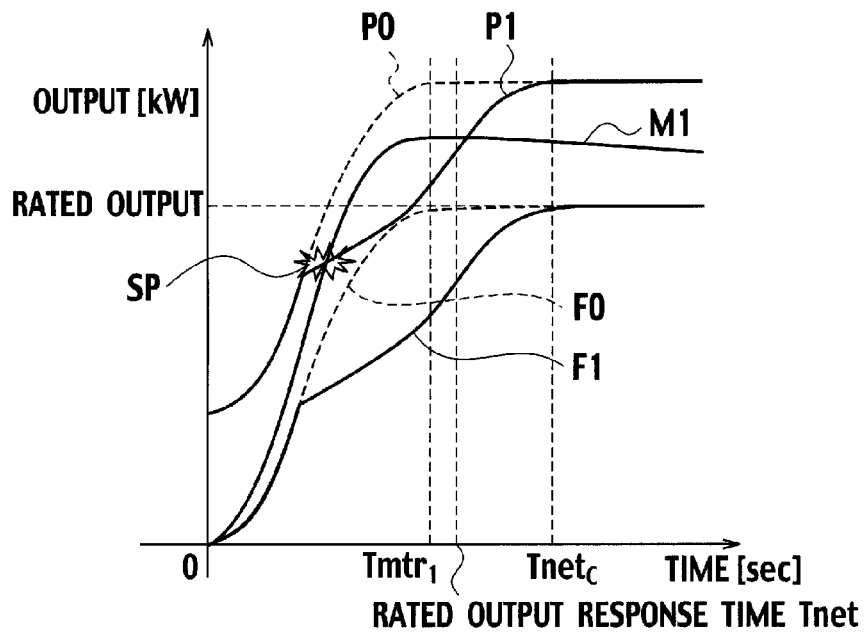
[Fig. 11]
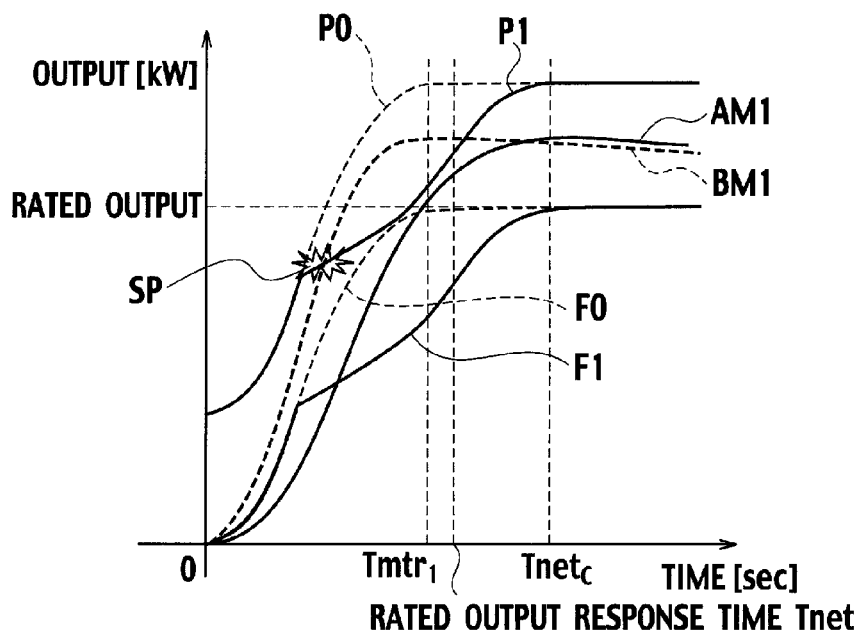

[Fig. 12]
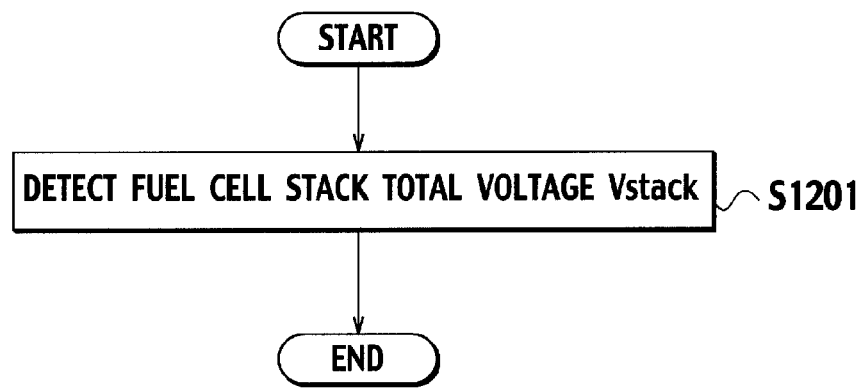
[Fig. 13]
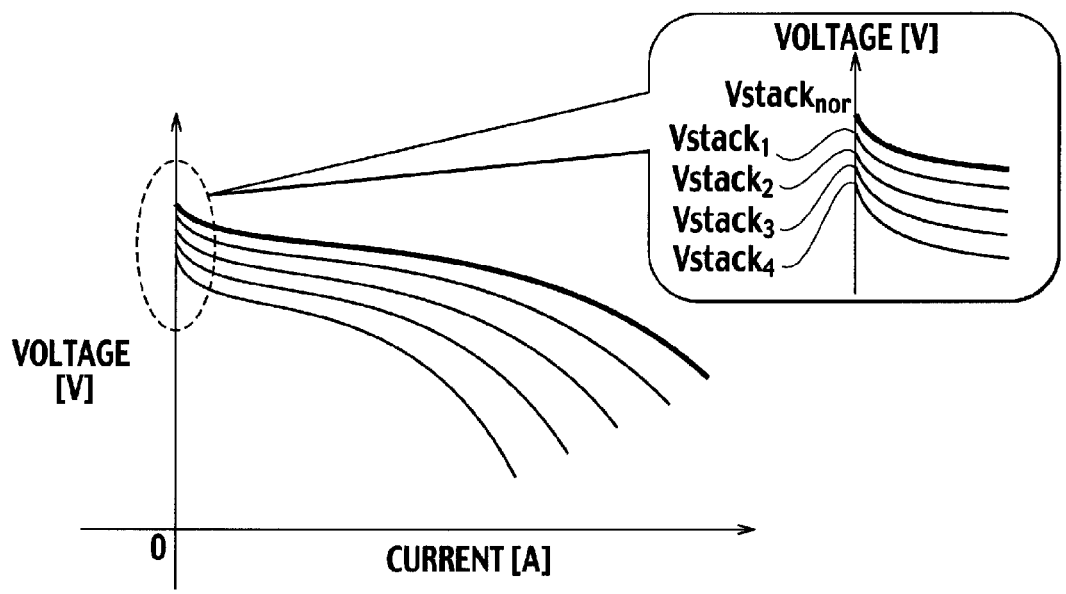

[Fig. 14]
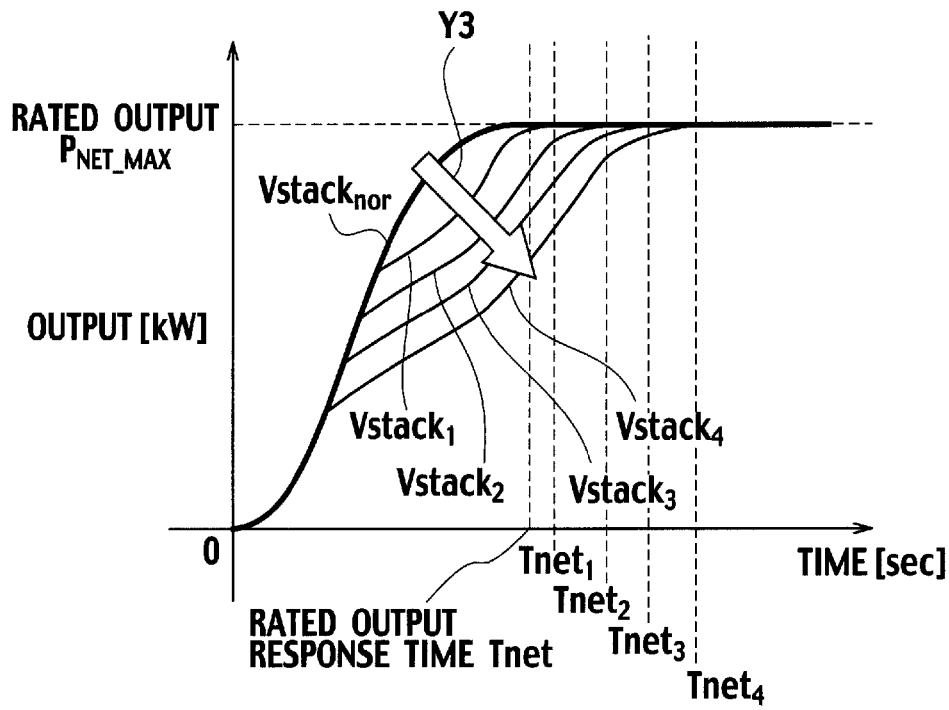
[Fig. 15]
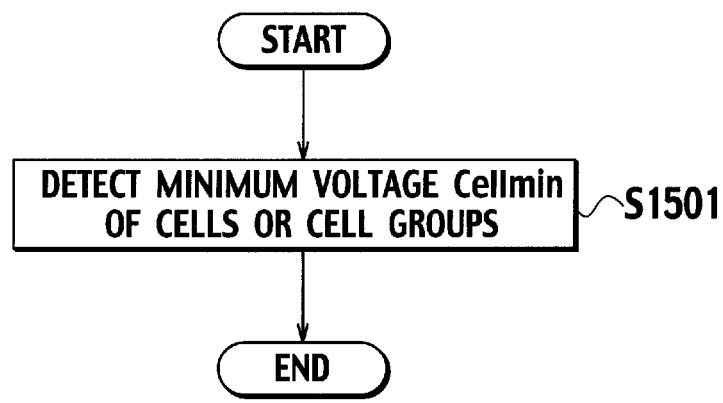

[Fig. 16]
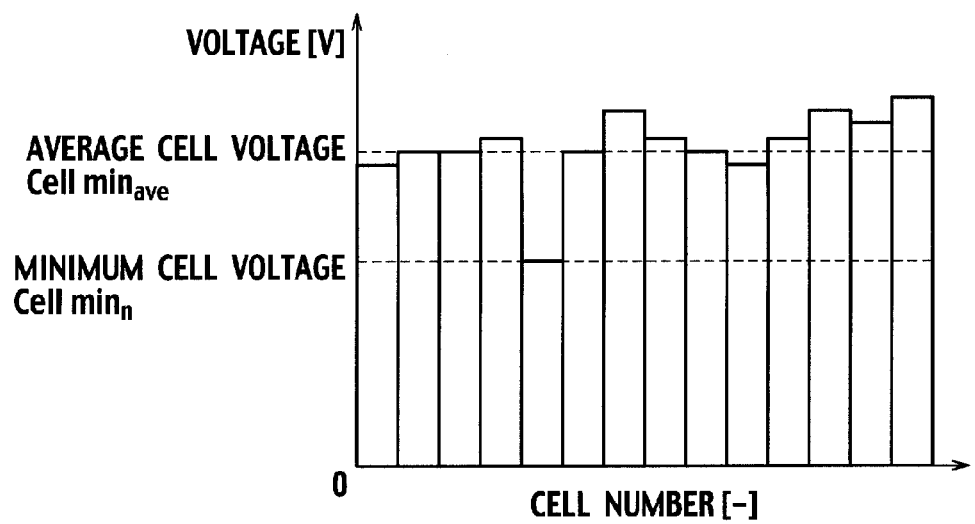
[Fig. 17]
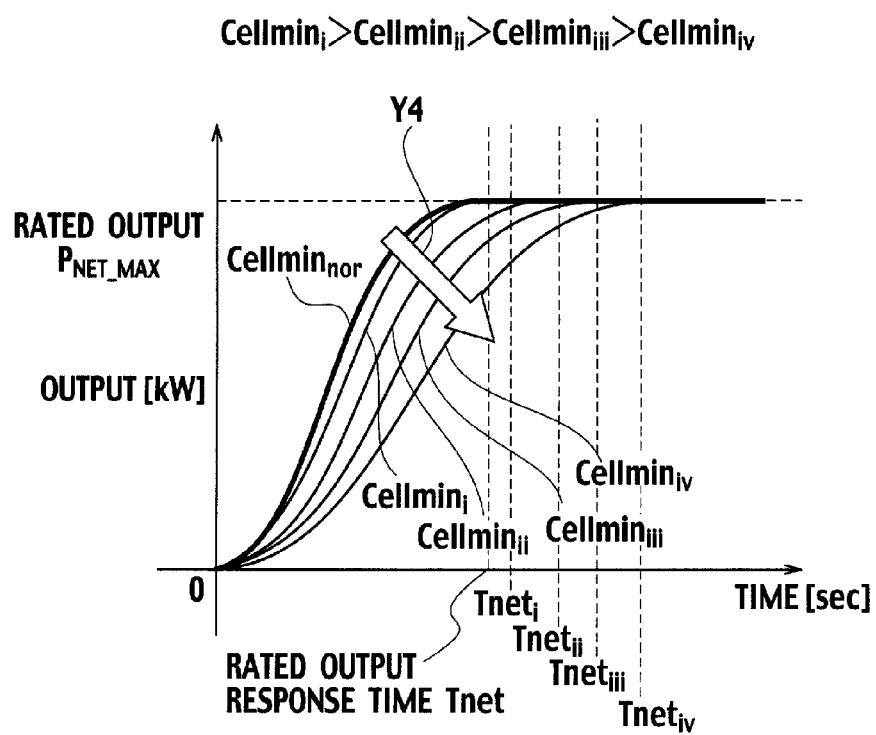

[Fig. 18]
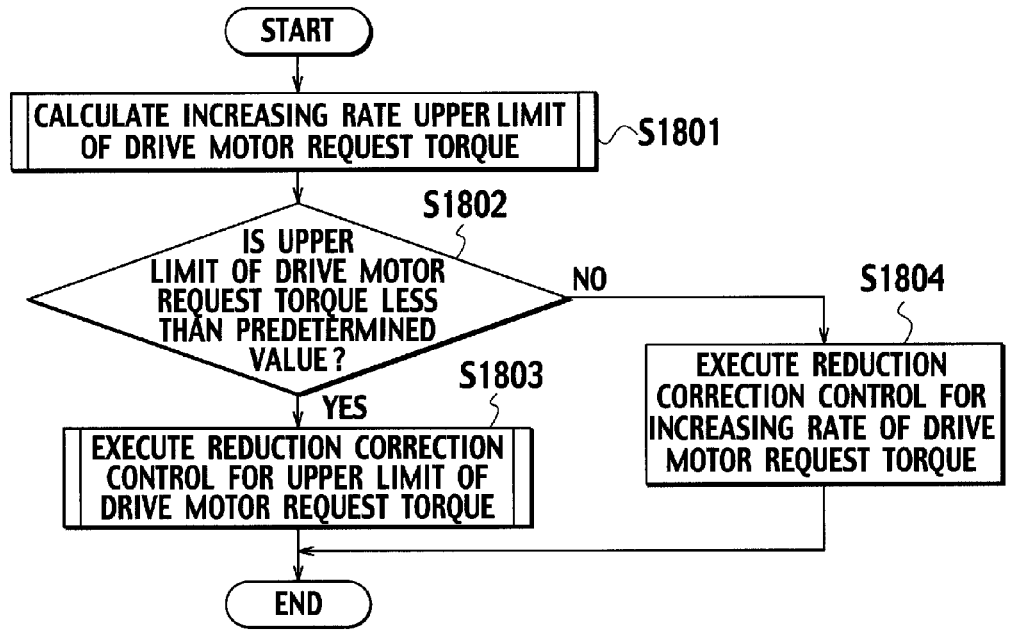
[Fig. 19]
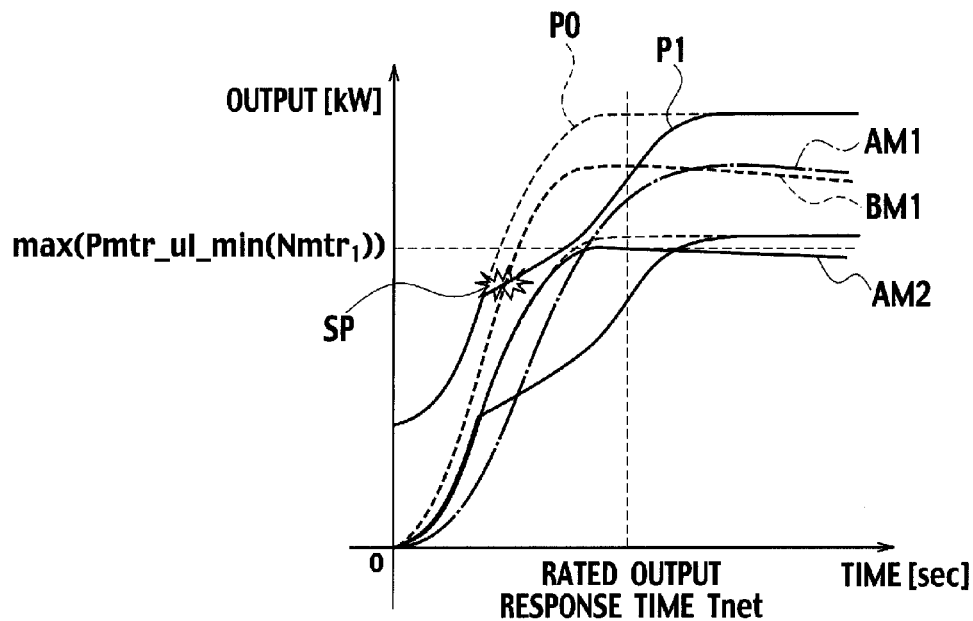

FUEL CELL DRIVE SYSTEM

BACKGROUND OF THE INVENTION

1. Field of the Invention

The present invention relates to a motor system which includes a fuel cell serving as a power supply and more specifically, to a motor system in which torque of a drive motor is controlled when the fuel cell returns from an idle stop mode to an idle mode.

2. Description of Related Art

As an intermittent drive technique for fuel cells, for example, a technique described in [Patent Citation 1] below has been known. This [Patent Citation 1] describes a technique used when, in a fuel cell system including a fuel cell and a secondary battery supplying load power, intermittent operation of the fuel cell is performed in such a way that the fuel cell is stopped in a low load range while the secondary battery supplies load power. In this technique, a threshold for start and stop of the fuel cell is adjusted according to open circuit voltage (OCV) of the fuel cell which is stopped. Employment of such a technique can prevent fuel consumption for maintaining the open circuit voltage while the fuel cell is stopped and can also improve response of restart from the state with lowered open circuit voltage of the fuel cell which has stopped generating power.

[Patent Citation 1] Japanese Patent Laid-open Publication No. 2005-71797

In a motor such as a drive motor supplied with power from a fuel cell as described above, generally, since rotational speed of the drive motor increases slowly enough with respect to the response requirement for drive torque in a low rotational speed range (different depending on specifications of the drive motor), the change in drive motor power requirement per unit time is small. On the other hand, in a medium-high rotational speed range (different depending on the specifications of the drive motor), the drive motor can provide a maximum output, and the response requirement for the drive torque is substantially equal to the change in drive motor power requirement.

When such a drive motor is used to drive a fuel cell vehicle, the torque response requirement of the drive motor is set based on the perspective of driving performance of the vehicle, and the change in drive motor power requirement is generally large in the medium-high rotational speed range of the drive motor. Accordingly, the power generation of the fuel cell is basically a high-load and rapid action.

On the other hand, after remaining in idle stop (an idle stop mode) for a predetermined time, the fuel cell goes into an inactive state with an increased amount of condensed water, lowered temperature of the body of the fuel cell, an increased amount of non-fuel gas (nitrogen gas), and the like. If the fuel cell is shifted from the same state to the idle mode and performs high-load and rapid power generation, therefore, the fuel cell may deteriorate because of reduction in cell voltage. In order to avoid such deterioration and protect the fuel cell, it may be necessary to limit an output of the fuel cell.

Accordingly, when the idle stop is carried out in the medium-high rotational speed range of the drive motor, there is a lot of influence by the aforementioned output limitation. Power supplied from the fuel cell to the drive motor becomes insufficient, and the torque of the drive motor may be required to be limited. In the fuel cell vehicle with such a drive motor mounted thereon, there is a problem of deterioration in driving performance (acceleration performance) of the vehicle.

The present invention was therefore made in the light of the above description, and an object of the present invention is to provide a motor system in which torque of a drive motor supplied with power from a fuel cell is properly controlled.

BRIEF SUMMARY OF THE INVENTION

In order to achieve the aforementioned object, the means for solving the problem of the present invention is characterized by including: a drive motor generating a drive force using power supplied from a fuel cell; an idle control unit stopping power generation of the fuel cell which is in idle operation into an idle stop mode and ending the idle stop mode to restart the power generation of the fuel cell; a state detection unit detecting a state of the fuel cell when the idle stop mode of the fuel cell ends; a recovery time estimation unit estimating a recovery time taken for total voltage of the fuel cell to reach voltage at the idle operation based on the state of the fuel cell detected by the state detection unit; and a control unit performing a correction control for torque of the drive motor based on the recovery time estimated by the recovery time estimation unit.

According to the present invention, it is possible to properly control the torque of the drive motor supplied with power from the fuel cell after recovery to the idle state according to the state of the fuel cell in the idle stop state.

BRIEF DESCRIPTION OF THE DRAWINGS

FIG. 1 is a diagram showing a basic configuration of the present invention.

FIG. 2 is a view showing a configuration of a motor system according to Embodiments 1 to 4 of the present invention.

FIG. 3 is a flowchart showing a procedure of a main process according to Embodiments 1 to 4 of the present invention.

FIG. 4 is a flowchart showing a part of the procedure shown in FIG. 3 according to Embodiment 1 of the present invention.

FIG. 5 is a graph showing a relation between idle stop duration and a fuel cell stack I-V characteristic.

FIG. 6 is a graph showing a relation between the idle stop duration and an output characteristic of a fuel cell stack when rated output response is requested.

FIG. 7 is a flowchart showing a part of the procedure shown in FIG. 3 according to Embodiment 1 of the present invention.

FIG. 8 is a graph showing a relation between the N-T characteristic and output characteristic of the drive motor.

FIG. 9 is a graph showing the drive motor output characteristic when the drive motor is fully accelerated at each rotational speed.

FIG. 10 is a graph showing a relation between drive motor available power and drive motor output characteristic.

FIG. 11 is a graph showing changes in amounts related to correction control to reduce drive motor request torque.

FIG. 12 is a flowchart showing a part of the procedure shown in FIG. 3 according to Embodiment 1 of the present invention.

FIG. 13 is a graph showing a relation between fuel cell stack total voltage at the end of idle stop and the fuel cell stack I-V characteristic.

FIG. 14 is a graph showing a relation between the fuel cell stack total voltage at the end of idle stop and fuel cell stack output characteristic when the rated output response is requested.

FIG. 15 is a flowchart showing a part of the procedure shown in FIG. 3 according to Embodiment 3 of the present invention.

FIG. 16 is a graph showing an example of cell voltage at the end of idle stop.

FIG. 17 is a graph showing a relation between minimum cell voltage at the end of idle stop and the output characteristic of the fuel cell stack when the rated output response is requested.

FIG. 18 is a flowchart showing a part of the procedure shown in FIG. 7 according to Embodiment 4 of the present invention.

FIG. 19 is a graph showing changes in amounts related to correction control for the upper limit of the drive motor request torque.

DETAILED DESCRIPTION OF THE INVENTION

Hereinafter, a description is given of best embodiments for carrying out the present invention using the drawings.

Embodiment 1

FIG. 1 is a diagram showing a basic configuration of a motor system according to Embodiment 1 of the present invention. The basic configuration of Embodiment 1 shown in FIG. 1 is a motor system including a drive motor which provides a drive force using electric power supplied from a fuel cell stack. The fuel cell stack can perform intermittent operation in which the fuel cell stack operates while transiting between an idle operation mode and an idle stop mode, via an idle control unit 100. The motor system includes: an idle stop end state detection unit 101 detecting a state of the fuel cell stack when the idle stop mode (hereinafter, idle stop) of the fuel cell stack ends; a fuel cell stack total voltage recovery time estimation unit 102 estimating a time for total voltage of the fuel cell stack to return to a normal idle state based on the idle stop end state detected by the idle stop end state detection unit 101; and a drive motor request torque reduction correction control unit 103 carrying out a correction control to reduce drive motor request torque which specifies torque of the drive motor based on the total voltage recovery time of the fuel cell stack estimated by the fuel cell stack total voltage recovery time estimation unit 102.

Herein, the "fuel cell" is a concept including: a "single cell" as a basic constituent unit of a battery which includes a set of an electrolyte and a pair of electrodes (an anode and a cathode) sandwiching the electrolyte; a "cell stack" as a basic constituent unit of a flat fuel cell which is a stack of single cells and includes a separator, a cooling plate, an output terminal, and the like; and a "cell module" composed of a plurality of the cell stacks to provide a predetermined output. Hereinafter, the "fuel cell" is called a fuel cell stack.

The fuel cell stack constitutes a fuel cell system which generates power by supplying fuel gas containing hydrogen and oxidation gas containing oxygen. The fuel cell system includes auxiliaries for supplying fuel gas, oxidation gas, cooling water, and the like to the fuel cell stack.

The fuel cell system is an apparatus directly converting energy included in fuel to electric energy. In this fuel cell system, fuel gas containing hydrogen is supplied to a positive electrode (anode) among the pair of electrodes which are provided so as to sandwich an electrolyte film while oxidation gas containing oxygen is supplied to the other negative electrode (cathode). The electric energy is extracted from the electrodes using electrochemical reaction occurring in surfaces of the pair of electrodes on the electrolyte film side. The reaction is expressed by the following formulas:

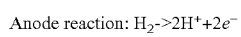

Anode reaction: $H_2 \rightarrow 2H^+ + 2e^-$

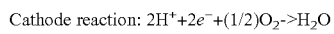

Cathode reaction: $2H^+ + 2e^- + (1/2)O_2 \rightarrow H_2O$

Known methods of supplying the fuel gas to the anode are: a method of directly supplying the fuel gas from a hydrogen storage apparatus; a method of reforming fuel containing hydrogen and supplying the hydrogen-contained gas; and the like. As the fuel containing hydrogen, there are natural gas, methanol, gasoline, and the like. As the oxidation gas supplied to the cathode, air is generally used.

The "idle operation" of the fuel cell stack indicates a state in which the fuel cell is operating without supplying electric power to an external load while providing to itself minimum load necessary for operation (power generation) and is a concept including no-load operation and stand-by operation (Japanese Industrial Standards No: JISC8800).

The "idle stop state" is a concept including: a state in which only power generation of the fuel cell stack is stopped in the idle operation; and a state in which operations of the auxiliaries constituting the fuel cell system are stopped in the idle operation in addition to the fuel cell stack. Furthermore, the state in which operations of the auxiliaries are stopped in addition to the fuel cell stack is a concept including a state in which the operation of at least one of auxiliaries concerning supply of the fuel gas, supply of the oxidation gas, and supply of water humidifying reaction gas is stopped.

FIG. 2 is a view showing an embodiment of a fuel cell vehicle to which the motor system of an embodiment of the present invention is applied. In FIG. 2, the motor system of this embodiment includes: a drive motor 201 driving drive wheels of the fuel cell vehicle; a drive motor inverter 202 converting DC power obtained by the fuel cell stack into AC power and supplying power to the drive motor according to drive motor request torque; a fuel cell stack 203 serving as a power supply of the drive motor 201; a drive unit 204 extracting power from the fuel cell stack 203; a cell voltage detector 205 detecting voltage of cells or cell groups of the fuel cell stack 203; a secondary battery 206 which is charged by power obtained by the fuel cell stack 203 and can supply the charged power to the drive motor; a battery controller 207 controlling and detecting conditions (voltage, charge and discharge current, an amount of charge, and the like) of the secondary battery 206; and a controller 210 controlling the entire system.

The controller 210 functions as a control center controlling actions of the motor system. The controller 210 is implemented by, for example, a microcomputer including resources necessary for a computer controlling various kinds of action processes based on programs, such as a CPU, a memory unit, and an input/output unit and implements functions of the basic configuration of the present invention shown in FIG. 1. The controller 210 reads signals from the drive motor inverter 202, drive unit 204, cell voltage detector 205, battery controller 207, an accelerator opening sensor 209 detecting an accelerator opening of an accelerator 208 of the fuel cell vehicle, and sensors collecting other information necessary for the control action of the motor system but cannot be obtained by the above sensors, such as pressure, temperature, voltage, and current, including a vehicle speed sensor (not shown) detecting speed of the fuel cell vehicle; sends an instruction to each constituent element of the motor system based on the various types of read signals and a control logic (program) previously held inside; and integrally manages and controls all the actions necessary for the operation of the motor system including torque control of the drive motor, which are described below.

The controller 210 calculates torque of the drive motor which is to be specified for the drive motor inverter 202 based on the accelerator opening detected by the accelerator opening sensor 209, the vehicle speed detected by the vehicle speed sensor, and the rotational speed of the drive motor 201 detected by the drive motor inverter 202. The controller 210 then estimates power consumption of the drive motor 201 and calculates power to be extracted from the fuel cell stack 203 and secondary battery 206. The drive motor inverter 202 and controller 210 may act as a rotational speed detection unit 104, as is known in the art. The rotational speed of the drive motor 201 may alternatively be measured by a rotational speed sensor previously provided.

Next, a description is given of working of the motor system.

The schematic working is performing a correction control to reduce the drive motor request torque according to estimated fuel cell stack total voltage recovery time based on various conditions at the end of the idle stop.

With reference to a flowchart of a main process shown in FIG. 3, the operation action of the drive motor 201 is described in detail. This process is executed every predetermined time, for example, 10 ms, from the start of the operation of the fuel cell. In FIG. 3, first, a state when the fuel cell stack 203 goes into the idle stop is detected (step S301). After the detection, the fuel cell stack total voltage recovery time is estimated based on the detected state at the end of the idle stop (step S302). After the estimation, the correction control is made to reduce the drive motor request torque based on the estimated fuel cell stack total voltage recovery time (step S303).

Next, a description is given of the method of detecting the idle stop end state in the above step S301 with reference to a flowchart of FIG. 4. In FIG. 4, first, an idle stop instruction value (fISGO) [−] set by the controller 210 is checked, and it is checked whether the fuel cell stack 203 is in the idle stop (step S401). For example, herein, when fISGO=1, the fuel cell stack 203 is considered to be in the idle stop, and when fISGO=0, the fuel cell stack 203 is considered to be generating power. Thereafter, it is judged whether the idle stop instruction value (fISGO) [−] checked above is "1" or "0" (step S402). As a result of the judgment, when fISGO=1, that is, the fuel cell stack 203 is in the idle stop, the previous idle stop instruction value (at the previous calculation) (an idle stop instruction previous value, fISGOz) [−] is judged, and it is judged whether the fuel cell stack 203 was generating power at the previous calculation (step S403). As a result of the judgment, when fISGOz=0, that is, the fuel cell stack 203 was generating power at the previous calculation, an idle stop duration (Tis) [sec] measured by the controller 210 is initialized, and the process is terminated (step S404).

On the other hand, in the result of the judgment of the above step S403, when fISGOz=1, that is, the fuel cell stack 203 was in the idle stop at the previous calculation, a cycle JOB of the above-described main process is added to the idle stop duration [sec] which has been measured (step S405).

On the other hand, in the result of the judgment of the above step S402, when fISGO=0, that is, the fuel cell stack 203 is generating power, the idle stop duration [sec] is not changed (step S406).

Next, a description is given of an example of the method of estimating the fuel cell stack total voltage recovery time shown in the step S302 of FIG. 3.

First, a relation between the idle stop duration and the I-V characteristic of the fuel cell stack 203 is previously calculated as shown in FIG. 5 by experiments or the like and stored in the controller 210. In this relation, as shown in FIG. 5, the longer the idle stop duration (Tis [sec]) becomes, the more the I-V characteristic of the fuel cell stack 203 deteriorates (Y1). Furthermore, a relation in the fuel cell stack 203 between the IV characteristic and an output characteristic is previously calculated as shown in FIG. 6 by experiments or the like and stored in the controller 210. In this relation, as shown in FIG. 6, it takes a certain time for the fuel cell I-V characteristic to return to the normal state (different depending on specifications of the fuel cell stack) at Tis=0, and accordingly, the curve of the output characteristic dips to form a concave curve, thus increasing a rated output response time (Tnet) until the recovery.

Accordingly, the rated output response time (Tnet) [sec] corresponding to the idle stop duration detected in the above step S301 shown in FIG. 3 is estimated based on the characteristics stored in the controller 210, which are shown in FIGS. 5 and 6. In FIG. 6, for example, the rated output response time is TnetC [sec] when the idle stop duration is TisC [sec]. Arrow Y2 shows that the longer Tis [sec] becomes the more rated output response deteriorates.

Next, a description is given of an example of the method of controlling the drive motor request torque shown in the step S303 of FIG. 3 with reference to a flowchart of FIG. 7.

In FIG. 7, first, a drive motor rotational speed Nmtr [rpm] is detected by the drive motor inverter 202 (step S701), and it is judged whether the detected drive motor rotational speed Nmtr is less than a predetermined value previously set (step S702). Herein, the predetermined value is set in a range of allowable rotational speed set according to the specifications and performance of the drive motor 201 as a threshold value between the low rotational speed range and medium and high rotational speed range which are set according to the specifications and performance of the drive motor 201 taking the aforementioned requirements into consideration. When the drive motor rotational speed is not less than the predetermined value as a result of the judgment, battery suppliable power Pbatt [kW] which can be supplied to the drive motor 201 is detected by the battery controller 207 (step S703).

Subsequently, based on the calculated battery suppliable power Pbatt and the above-described rated output Pnet [kW] of the fuel cell stack 203 corresponding to the idle stop duration, drive motor available power Pall [kW] is calculated (step S704). After the calculation, based on the drive motor rotational speed Nmtr detected in the aforementioned step S701, a drive motor output characteristic Pmtr_ul (Nmtr) [kW] is subsequently calculated (step S705).

After the calculation, the drive motor available power Pall calculated in the above step S704 is compared with the drive motor output characteristic Pmtr_ul (Nmtr) calculated in the above step S705 (step S706). In the comparison, it is judged whether the drive motor available power Pall is sufficient with respect to the drive motor output characteristic Pmtr_ul (Nmtr) (step S707). As a result of the judgment, when the drive motor available power Pall is judged to be insufficient, the correction control to reduce the drive motor request torque is executed (step S708).

On the other hand, when the drive motor available power Pall is sufficient as a result of the judgment, a normal control for the drive motor request torque is executed without performing the correction to reduce the torque (step S709).

Next, a description is given of an example of the method of calculating the drive motor available power Pall which is executed in the step S704 of FIG. 7.

First, the drive motor available power Pall is calculated using the following equation (1) where Paux [kW] is power consumption of the auxiliaries of the fuel cell vehicle which require power supply from the fuel cell stack 203 and secondary battery 206.

(Equation 1)

$$Pall = Pnet + Pbatt - Paux \quad (1)$$

Herein, as described above, Pnet is the rated output of the fuel cell stack, and Pbatt is power which is allowed to can be supplied from the secondary battery 206.

Next, a description is given of an example of the method of calculating the drive motor output characteristic Pmtr_ul (Nmtr) which is executed in the step S705 of FIG. 7.

First, based on an increasing rate upper limit delta Tqmtr_ul (Nmtr) [Nm/sec] of the drive motor request torque, which is previously designed based on the perspective of driving performance, acceleration performance, and the like, an increasing rate upper limit delta Pmtr_ul (Nmtr) [Kw/sec] of the drive motor output is calculated from the drive motor output characteristic when the drive motor 201 is really operated. Furthermore, in the same way as described above, the drive motor output characteristic Pmtr_ul (Nmtr) [kW] is calculated based on an N (rotational speed)-T (torque) characteristic of the drive motor request torque previously designed based on the perspective of the driving performance, acceleration performance, and the like. The relation between the output characteristic Pmtr_ul (Nmtr) of the drive motor 201 and the N-T characteristic of the drive motor request torque is, for example, a relation shown in FIG. 8.

Based on the thus calculated output characteristic Pmtr_ul (Nmtr) of the drive motor 201 and the increasing rate upper limit delta Pmtr_ul (Nmtr) of the drive motor output, the drive motor output response time Tmtr [sec] corresponding to the drive motor rotational speed (Nmtr) is calculated using the following equation (2).

(Equation 2)

$$Tmtr(Nmtr) = Pmtr\_ul(Nmtr)/\text{delta } Pmtr\_ul(Nmtr) \quad (2)$$

The drive motor output characteristic Pmtr_ul (Ntmr) [kW] is calculated using the following equation (3) when the upper limit of the drive motor request torque of the drive motor 201 at rotational speed Nmtr is Tqmtr_ul (Nmtr) [Nm] and power loss of the drive motor 201 at these torque and rotational speed is Loss_mtr (Nmtr, Tqmtr_ul (Nmtr)) [kW].

(Equation 3)

$$Pmtr\_ul(Nmtr) = (2 \text{ pi} \times Nmtr \times Tqmtr\_ul(Nmtr))/60/1000 + Loss\_mtr(Nmtr, Tqmtr\_ul(Nmtr)) \quad (3)$$

In the output characteristic Pmtr_ul (Nmtr) of the drive motor 201 which is calculated according to the rotational speed of the drive motor 201 in such a manner, the drive motor output characteristics Pmtr_ul (Nmtr0) and Pmtr_ul (Nmtr1) when the drive motor 201 fully accelerates at rotational speeds Nmtr0 and Nmtr 1 (Nmtr0<Nmtr1) are, for example, characteristics shown in FIG. 9. In the FIG. 9, C0 shows drive motor output characteristic Pmtr_ul (Nmtr0) during full acceleration at Nmtr0 [rpm], and C1 shows drive motor output characteristic Pmtr_ul (Nmtr1) during full acceleration at Nmtr1 [rpm].

Next, a description is given of an example of the method of comparing the drive motor available power Pall and drive motor output characteristic Pmtr_ul (Nmtr) which is executed in the step S706 of FIG. 7.

First, FIG. 10 shows together the rated output characteristic Pnet of the fuel cell stack 203 corresponding to the idle stop duration TisC, which is shown in FIG. 6, the drive motor output characteristic Pmtr_ul (Nmtr1) corresponding to the drive motor rotational speed Nmtr1, which is shown in FIG. 9, and the drive motor available power Pall corresponding to idle stop durations Tis0 and TisC. In the FIG. 10, P0 shows drive motor available power Pall obtained by adding battery available power to fuel cell stack output characteristic at Tis=0, P1 shows drive motor available power Pall obtained by adding battery available power to fuel cell stack output characteristic at Tis=C, M1 shows drive motor output characteristic Pmtr_ul (Nmtr1), F0 shows fuel cell stack output characteristic at Tis=0, and F1 shows fuel cell stack output characteristic at Tis=TisC. SP shows region where drive motor output characteristic exceeds drive motor available power. As shown in FIG. 10, the drive motor available power Pall is found to be sufficient with respect to the drive motor output characteristic Pmtr_ul (Nmtr1) at the idle stop duration Tis=0 (Tis0) but not sufficient at TisC.

Next, a description is given of an example of the correction control to reduce the drive motor request torque executed in the step S708 of FIG. 7.

Based on the increasing rate upper limit delta Tqtmr_ul (Nmtr) [Nm/sec] of the drive motor request torque which is set corresponding to the drive motor rotational speed Nmtr1, the increasing rate upper limit delta Pmtr_ul (Nmtr1) [kW/sec] of the drive motor output is corrected to be reduced, and corrected increasing rate upper limit delta Tqmtr_ul (Nmtr1)' [Nm/sec] of the drive motor is calculated using the following equation (4) based on the corrected increasing rate upper limit delta Pmtr_ul (Nmtr1)' of the drive motor output when the corrected drive motor output characteristic Pmtr_ul (Nmtr1)' is below the drive motor available power Pall.

(Equation 4)

$$\text{delta } Tqmtr\_ul(Nmtr1)' = (A/B)/2 \text{ pi} \times Nmtr1 \quad (4)$$

A=delta Pmtr_ul (Nmtr1)'−Loss_mtr (Nmtr, Tqmtr_ul (Nmtr1))

B=Pmtr_ul (Nmtr1)'/delta Ptmtr_ul (Nmtr1)'

FIG. 11 shows an example of a relation among the drive motor output characteristics before and after the correction, the drive motor available power, and the fuel cell stack rated output characteristic. In the FIG. 11, P0 shows drive motor available power Pall obtained by adding battery available power to fuel cell stack output characteristic at Tis=0, P1 shows drive motor available power Pall obtained by adding battery available power to fuel cell stack output characteristic at Tis=C, AM1 shows drive motor output characteristic Pmtr_ul (Nmtr1)' after correction, BM1 shows drive motor output Pmtr_ul (Nmtr1) before correction, F0 shows fuel cell stack output characteristic at Tis=0, and F1 shows fuel cell stack output characteristic at Tis=TisC. SP shows region where drive motor output characteristic exceeds drive motor available power.

On the other hand, as another example of the calculation, there are a calculation method using the following equation (5) and the like. Specifically, a maximum torque Tqmtr_ul (Nmtr) [Nm] of the drive motor 201 is calculated based on the rated output response time TnetC of the fuel cell stack 203, for example, for the idle stop duration TisC and the drive motor N-T characteristic at the drive motor rotational speed Nmtr1 which is shown in FIG. 8. The calculated maximum torque Tqmtr_ul (Nmtr) is divided by the rated output response time TnetC of the fuel cell stack and then multiplied with a torque increasing rate correction factor k(Pbatt) according to the battery suppliable power Pbatt to calculate the corrected increasing rate upper limit delta Tqmtr_ul (Nmtr)' of the drive motor request torque.

Equation 5

$$\text{delta } Tqmtr\_ul(Nmtr1)' = Tqmtr\_ul/Tnet_c \times k(P\text{batt}) \quad (5)$$

As described above, in the aforementioned Embodiment 1, the correction control to reduce the drive motor request torque is made taking into consideration the state of the fuel cell stack which is inactive because of the idle stop so that the output request is not rapid. Accordingly, the torque of the drive motor 201 which is supplied with power after returning to the idle mode can be properly controlled according to the state of the fuel cell stack 203 in the idle stop. In the fuel cell vehicle, it is therefore possible to prevent significant deterioration of the driving performance (deterioration of the acceleration performance) due to the output limitation for protection of the fuel cell stack.

Moreover, the increasing rate of the drive motor request torque is corrected and reduced so that the output request for the fuel cell stack 203 is not rapid. It is therefore possible to prevent significant deterioration of the driving performance (deterioration of the acceleration performance) due to output limitation for protection of the fuel cell stack.

The fuel cell stack total voltage recovery time is estimated based on the idle stop duration until the start of power generation of the fuel cell stack. The fuel cell stack total voltage recovery time can be therefore calculated with high accuracy. The correction to reduce the increasing rate of the drive motor request torque is carried out when the drive motor rotational speed is not less than a predetermined value. Accordingly, in the low rotational speed range of the drive motor in which there is less effect by the output limitation for protection of the fuel cell stack, it is possible to achieve normal driving performance (acceleration performance).

The correction to reduce the increasing rate of the drive motor request torque is performed when the upper limit of the secondary battery output is not more than the predetermined value. Accordingly, it is possible to achieve normal driving performance (acceleration performance) for the upper limit of the secondary battery output in which the secondary battery 206 can absorb effects by the output limitation for protection of the fuel cell stack.

Embodiment 2

Next, a description is given of Embodiment 2 of the present invention. In the Embodiment 1 described above, the idle stop duration is detected by the idle stop end state detection unit 101 as the state of the fuel cell stack 203 at the end of the idle stop. This Embodiment 2 is characterized in that the total voltage of the fuel cell stack 203 is detected instead of the idle stop duration and the fuel cell stack total voltage recovery time is estimated based on the detected total voltage, and the other part is the same as Embodiment 1.

Next, a description is given of the method of detecting the idle stop end state with reference to a flowchart of FIG. 12.

In FIG. 12, total voltage Vstack [v] of the fuel cell stack 203 is detected by the drive unit 204 (step S1201).

Next, a description is given of an example of the method of estimating the fuel cell stack total voltage recovery time based on the detected total voltage Vstack of the fuel cell stack 203.

First, a relation shown in FIG. 13 between the fuel cell stack total voltage Vstack (Vstacknor>Vstack1>Vstack2>Vstack3>Vstack4) at the end of the idle stop and the fuel cell stack I-V characteristic is previously calculated by experiments or the like and stored in the controller 210. As shown in FIG. 13, generally, the lower the fuel cell stack total voltage at the end of the idle stop becomes, the more the fuel cell stack I-V characteristic deteriorates.

In such a fuel cell stack I-V characteristic, FIG. 14 shows an example of the output characteristic Pnet [kW] when the fuel cell stack 203 is caused to generate rated output power. As shown in FIG. 14, it takes a certain time for the fuel cell stack I-V characteristic to return to the normal state (Vstacknor, different depending on the specifications of the fuel cell stack), and accordingly, the curve of the output characteristic dips to form a concave curve, thus increasing the rated output response time (Tnet) until the recovery. Arrow Y3 shows that the lower the fuel cell stack total voltage Vstack is, the more the rated output response deteriorates. Such a characteristic is stored in the controller 210.

Based on the characteristics previously stored in the controller 210, which are shown in FIGS. 13 and 14, the rated output response time (Tnet) [sec] corresponding to the fuel cell stack total voltage detected in the above step S1201 shown in FIG. 12 is estimated. For example, in FIG. 14, the rated output response time is Tnet3 [sec] when the fuel cell stack total voltage is Vstack3 [V].

Thereafter, based on the thus estimated fuel cell stack total voltage recovery time (=rated output response time), the same procedure as that of Embodiment 1 described above is executed to control the drive motor request torque.

In Embodiment 2 described above, the fuel cell stack total voltage recovery time is estimated based on the fuel cell stack total voltage at the start of power generation of the fuel cell stack. Accordingly, the fuel cell stack total voltage recovery time can be obtained with high accuracy.

Embodiment 3

Next, a description is given of Embodiment 3 of the present invention. In Embodiment 1 described above, the idle stop duration is detected by the idle stop end state detection unit 101 as the state of the fuel cell stack 203 at the end of the idle stop. This Embodiment 3 is characterized in that minimum voltage of the cells or cell groups of the fuel cell stack 203 is detected instead of the idle stop duration and the fuel cell stack total voltage recovery time is estimated based on the minimum voltage, and the other part is the same as Embodiment 1 described above.

Next, a description is given of a method of detecting the idle stop end state with reference to a flowchart of FIG. 15.

In FIG. 15, voltages [v] of the cells or previously set cell groups of the fuel cell stack 203 are detected by the cell voltage detector 205, and based on the detected voltages, a minimum cell voltage or minimum cell group voltage is calculated by the controller 210 (step S1501). The following description is given with the minimum cell voltage.

Next, a description is given of an example of the method of estimating the fuel cell stack total voltage recovery time based on the detected minimum cell voltage Cellmin of the fuel cell stack 203.

First, a relation between cell voltage Cell of the fuel cell stack 203 at the end of the idle stop and the fuel cell stack I-V characteristic is previously calculated as shown in FIG. 16 by experiments or the like and stored in the controller 210. Generally, the lower the minimum cell voltage of the fuel cell stack at the end of the idle stop becomes, the more the fuel cell stack I-V characteristic deteriorates.

In such an I-V characteristic of the fuel cell stack exhibiting such a characteristic, FIG. 17 shows an example of the output characteristic Pnet [kW] when the fuel cell stack 203 is caused to generate rated output power. As shown in FIG. 17, it takes a certain time for the fuel cell stack I-V characteristic to return to the normal state (Cellminnor), and, accordingly, the curve of the output characteristic dips to form a concave curve, thus increasing the rated output response time (Tnet) until the recovery. Arrow Y4 shows that the lower Cellminn [v] is, response time needs to be increased for protecting fuel cell stack. Such a characteristic is stored in the controller 210.

Based on the fuel cell stack I-V characteristic and characteristic shown in FIG. 17 which are previously stored in the controller 210, the rated output response time (Tnet) [sec]

corresponding to the minimum cell voltage of the fuel cell stack 203 detected in the above step S1501 shown in FIG. 15 is estimated. For example, in FIG. 17, the rated output response time is Tnetiii [sec] when the minimum cell voltage of the fuel cell stack 203 is Cellminiii [V].

Thereafter, based on the thus estimated fuel cell stack total voltage recovery time (=rated output response time), the same procedure as Embodiment 1 previously described is executed to control the drive motor request torque.

In Embodiment 3 described above, the fuel cell stack total voltage recovery time is estimated based on the minimum voltage of the cells or cell groups of the fuel cell stack 203 at the start of power generation of the fuel cell stack 203. The fuel cell stack total voltage recovery time can be therefore obtained with high accuracy.

Embodiment 4

Next, a description is given of Embodiment 4 of the present invention. In Embodiment 1 described above, the increasing rate of the drive motor torque is controlled and corrected to be reduced in the correction control to reduce the drive motor torque executed in the step S708 of FIG. 7. This Embodiment 4 is characterized in that the upper limit of the drive motor torque is corrected to be reduced instead of the increasing rate of the drive motor torque, and the other part is the same as the Embodiment 1, 2, or 3 described above.

In this Embodiment 4, the process in the step S708 shown in FIG. 7 is executed according to a procedure shown in a flowchart of FIG. 18. In FIG. 15, first, in the same manner as the increasing rate upper limit delta Tqmtr_ul (Nmtr1)' [Nm/sec] of the drive motor request torque described in Embodiment 1, the increasing rate upper limit of the drive motor request torque is calculated (step S1801).

Thereafter, it is judged whether the increasing rate upper limit of the drive motor request torque calculated in the above step S1801 is less than a predetermined value previously set, that is, a minimum value delta Tqmtr_ul_min (Nmtr1) [Nm/10 ms] of the increasing rate upper limit of the drive motor request torque (step S1802). As a result of the judgment, when the increasing rate upper limit of the drive motor request torque calculated in the above step S1801 is less than the minimum value of the increasing rate upper limit of the drive motor request torque, the correction control to reduce the increasing rate upper limit of the drive motor request torque is stopped, and a correction control to reduce the upper limit of the drive motor request torque is executed (step S1803).

On the other hand, as a result of the judgment, when the increasing rate upper limit of the drive motor request torque calculated in the above step S1801 is not less than the minimum value of the increasing rate upper limit of the drive motor request torque, the correction control for the same torque increasing rate upper limit is executed (step S1804).

Next, with reference to FIG. 19, a description is given of the correction control to reduce the upper limit of the drive motor request torque executed in the step S1803 shown in FIG. 18.

The minimum value delta Tqmtr_ul_min (Nmtr1) of the increasing rate upper limit of the drive motor request torque according to the drive motor rotational speed which is previously designed based on the perspective of the driving performance, acceleration performance, and the like of the fuel cell vehicle is converted to electric power to calculate the minimum value delta Pmtr_ul_min (Nmtr1) [kW/10 ms] of the increasing rate upper limit of the drive motor output. Subsequently, a maximum value max (Pmtr_ul_min (Nmtr1)) [kW] of the drive motor output which can be achieved with the minimum value of the increasing rate upper limit of the drive motor output is calculated. Thereafter, the upper limit Tqmtr_ul (Nmtr1)' [Nm] of the drive motor request torque is calculated using the following Equation (6).

(Equation 6)

$$Tqmtr\_ul(Nmtr1)' = (C-D)/2\pi \times Nmtr1 \quad (6)$$

C=max(Pmtr_ul_min(Nmtr1))
D=Loss_ul (Nmtr1, Tqmtr_ul (Nmtr1)) (power loss at the torque Tqmtr_ul (Nmtr1) and rotational speed Nmtr1 of the drive motor 201)

In this manner, when the increasing rate upper limit of the drive motor request torque realizing the corrected drive motor output characteristic Pmtr_ul (Nmtr1)' may significantly deteriorate the driving performance and acceleration performance of the vehicle, the upper limit of the drive motor request torque is corrected to be reduced as shown in FIG. 19. In the FIG. 19, P0 shows drive motor available power Pall obtained by adding battery available power to normal fuel cell stack output characteristic, P1 shows drive motor available power Pall obtained by adding battery available power to fuel cell stack output characteristic after idle stop, AM1 shows drive motor output characteristic Pmtr_ul (Nmtr1) after correction, and BM1 shows drive motor output characteristic Pmtr_ul (Nmtr1) before correction. AM2 shows that When increasing rate upper limit delta Tqmtr_ul (Nmtr)' [Nm/10 ms] of drive motor request torque which realizes drive motor output characteristic Pmtr_ul (Nmtr1)' [kW] after correction may significantly deteriorate driving and acceleration performances, upper limit of instruction torque is corrected and reduced. SP shows region where drive motor output characteristic exceeds drive motor available power.

Accordingly, in Embodiment 4 described above, when the driving performance is affected by the correction to reduce the increasing rate of the drive motor request torque calculated based on the estimated value of the fuel cell stack total voltage recovery time, the upper limit of the drive motor request torque is corrected to be reduced, thus preventing significant deterioration in the driving performance (deterioration of the acceleration performance) due to the output limitation for protection of the fuel cell stack.

The invention claimed is:

1. A motor system, comprising:
   a drive motor configured to generate a drive force using power supplied from a fuel cell;
   an idle control unit configured to operate the fuel cell intermittently between an idle operation mode and an idle stop mode;
   a state detection unit configured to detect a state of the fuel cell when the idle stop mode of the fuel cell ends;
   a recovery time estimation unit configured to estimate a recovery time taken for total voltage of the fuel cell to reach voltage at the idle operation based on the state of the fuel cell detected by the state detection unit; and
   a control unit configured to perform a correction control for torque of the drive motor based on the recovery time estimated by the recovery time estimation unit.

2. The motor system according to claim 1, further comprising:
   a rotational speed detection unit configured to detect rotational speed of the drive motor, wherein
   the control unit corrects and reduces an upper limit of the torque of the drive motor when the rotational speed detected by the rotational speed detection unit is not less than a predetermined rotational speed previously set.

3. The motor system according to claim 1, wherein the state detection unit detects as the state of the fuel cell an idle stop duration when the fuel cell is in the idle stop mode; and the recovery time estimated by the recovery time estimation unit is increased as the idle stop duration detected by the state detection unit increases.

4. The motor system according to claim 1, wherein the state detection unit detects total voltage of the fuel cell as the state of the fuel cell; and the recovery time estimated by the recovery time estimation unit is increased as the total voltage of the fuel cell detected by the state detection unit decreases.

5. The motor system according to claim 1, further comprising:

a rotational speed detection unit detecting rotational speed of the drive motor, wherein the control unit performs the correction control when the rotational speed detected by the rotational speed detection unit is not less than predetermined rotational speed previously set.

6. The motor system according to claim 1, wherein the motor system is mounted on a fuel cell vehicle in which drive wheels are driven by the drive motor driven by power obtained by the fuel cell.

7. A motor system, comprising:

a drive motor configured to generate a drive force using power supplied from a fuel cell; and a controller configured to:

stop power generation of the fuel cell by placing the fuel cell in an idle stop mode, and restart the power generation of the fuel cell by placing the fuel cell in an idle operation mode, detect a state of the fuel cell when the idle stop mode of the fuel cell ends, estimate a recovery time taken for total voltage of the fuel cell to reach voltage at the idle operation based on the detected state of the fuel cell, and perform a correction control for torque of the drive motor based on the estimated recovery time.

* * * * *